(12) United States Patent
Long

(10) Patent No.: US 12,509,216 B1
(45) Date of Patent: Dec. 30, 2025

(54) AERODYNAMIC ROTOR BLADE CONFIGURATIONS

(71) Applicant: Wisk Aero LLC, Mountain View, CA (US)

(72) Inventor: Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 18/895,111

(22) Filed: Sep. 24, 2024

Related U.S. Application Data

(63) Continuation of application No. 17/948,545, filed on Sep. 20, 2022, now Pat. No. 12,122,503.

(60) Provisional application No. 63/246,275, filed on Sep. 20, 2021.

(51) Int. Cl.
*B64C 11/04* (2006.01)
*B64C 11/46* (2006.01)
*B64C 27/02* (2006.01)
*B64C 27/22* (2006.01)

(52) U.S. Cl.
CPC .............. *B64C 11/04* (2013.01); *B64C 11/46* (2013.01); *B64C 27/021* (2013.01); *B64C 27/22* (2013.01)

(58) Field of Classification Search
CPC ...... B64C 27/30; B64U 20/50; B64U 30/293; B64U 30/296
See application file for complete search history.

(56) References Cited

U.S. PATENT DOCUMENTS

| | | | |
|---|---|---|---|
| 10,392,104 B1* | 8/2019 | Urban | B64U 30/293 |
| 11,267,570 B2 | 3/2022 | Villa et al. | |
| 11,673,658 B2 | 6/2023 | Jordan | |
| 2010/0243821 A1* | 9/2010 | Lim | B64C 27/08 244/7 A |
| 2018/0362154 A1* | 12/2018 | Louis | B64U 10/20 |
| 2019/0135425 A1 | 5/2019 | Moore et al. | |
| 2019/0382106 A1* | 12/2019 | Prager | B64C 29/0025 |
| 2020/0269990 A1 | 8/2020 | Bevirt et al. | |
| 2021/0253231 A1* | 8/2021 | Ensslin | B64C 11/28 |
| 2021/0316851 A1 | 10/2021 | Ensslin | |
| 2022/0111956 A1 | 4/2022 | Jordan | |
| 2022/0194557 A1 | 6/2022 | Thomas et al. | |
| 2024/0030780 A1* | 1/2024 | Sato | B64D 35/026 |

OTHER PUBLICATIONS

U.S. Appl. No. 17/948,545, "Notice of Allowance", Jul. 25, 2024, 8 pages.

* cited by examiner

*Primary Examiner* — Philip J Bonzell
*Assistant Examiner* — Cindi M Curry
(74) *Attorney, Agent, or Firm* — Kilpatrick Townsend & Stockton LLP

(57) ABSTRACT

Embodiments of the invention are directed to systems and methods for reducing drag on an aircraft. The aircraft can include at least one propulsion system with rotor blades configured to reduce aerodynamic drag when the propulsion system is deactivated. To reduce the amount of drag, the rotor blades can be locked into an aerodynamic position, and prevented from passively spinning. Additionally, the rotor blades can be configured to have angular positions that reduce drag. For example, the rotor blades as a group may be configured to generally point toward and/or away from an airflow current.

20 Claims, 5 Drawing Sheets

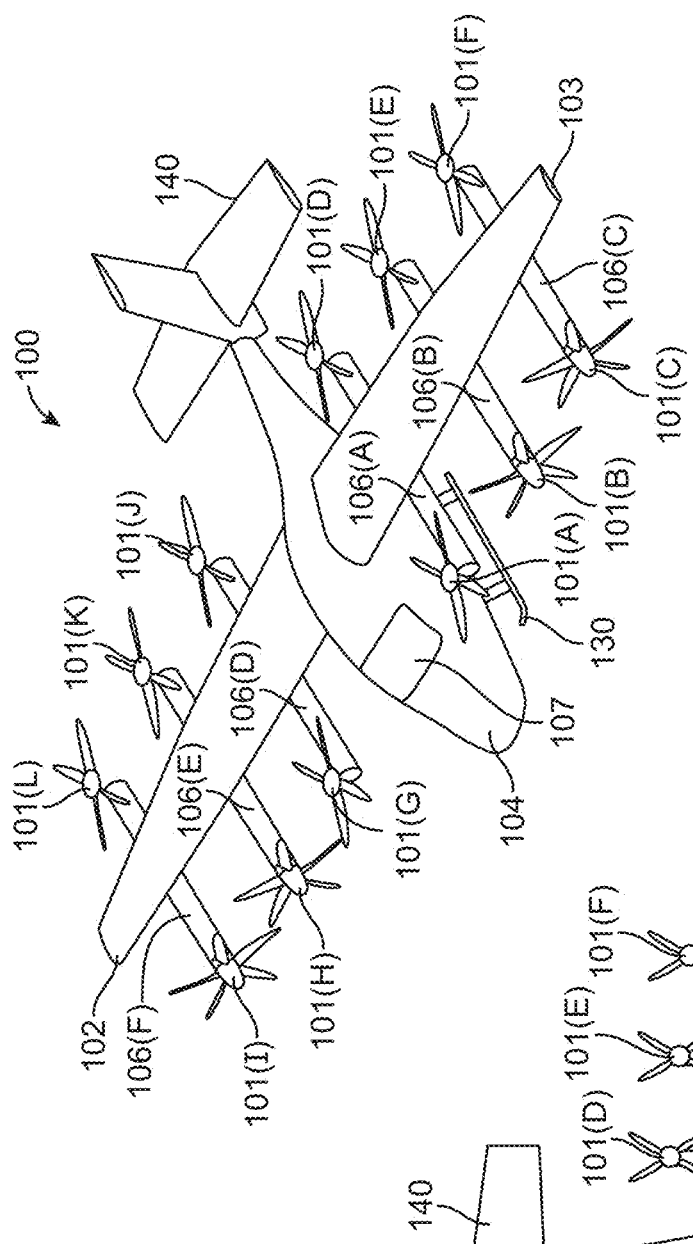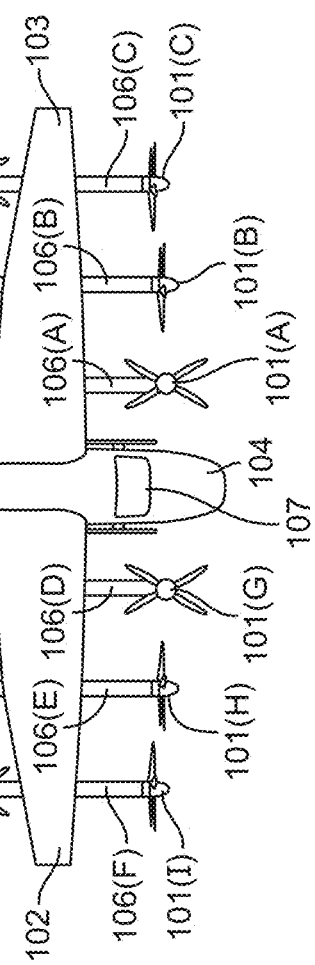
FIG. 1A
FIG. 1B

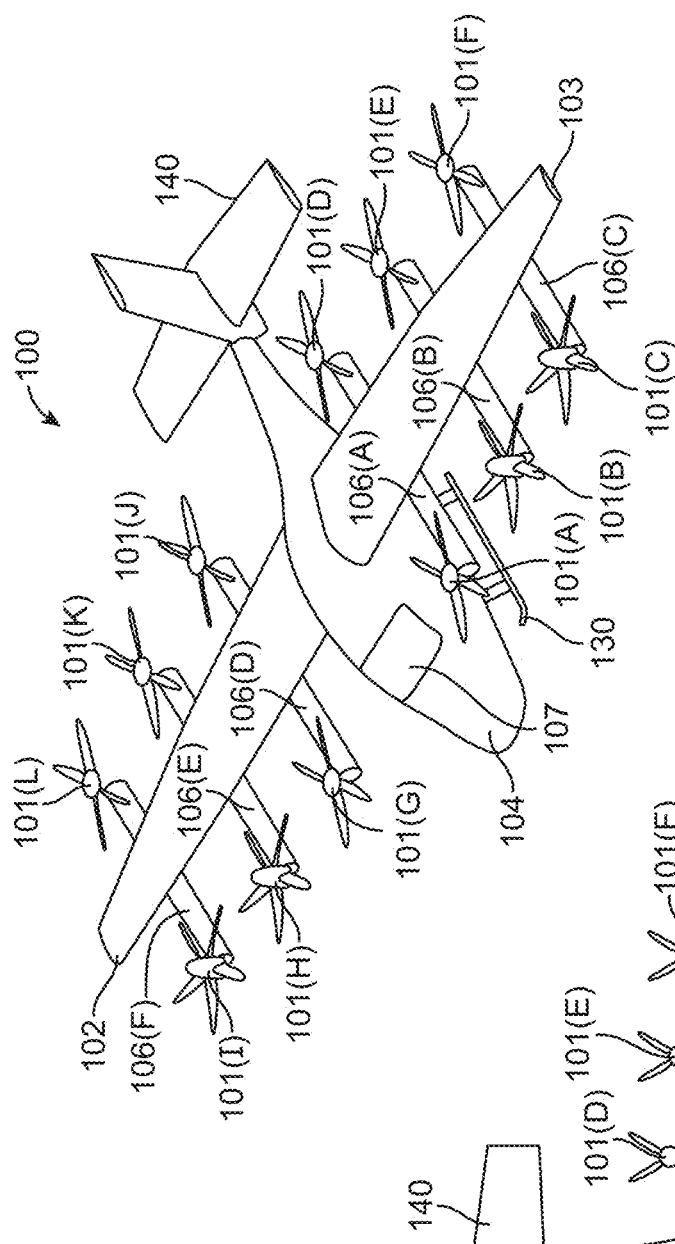
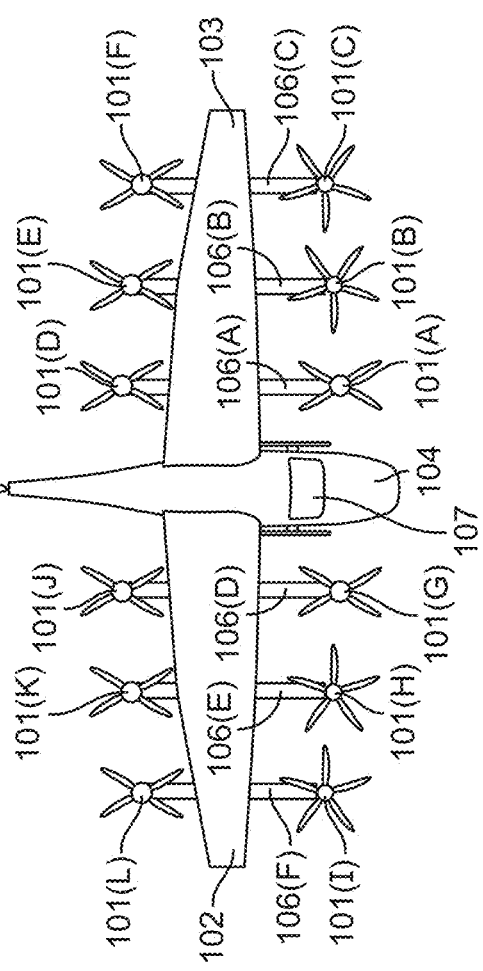
FIG. 2A
FIG. 2B

AERODYNAMIC ROTOR BLADE CONFIGURATIONS

RELATED APPLICATIONS

This application is a continuation of U.S. patent application Ser. No. 17/948,545 filed Sep. 20, 2022, and entitled "AERODYNAMIC ROTOR BLADE CONFIGURATIONS," which claims benefit under 35 USC § 119 (e) to U.S. Provisional Patent Application No. 63/246,275 filed Sep. 20, 2021, and entitled "VTOL AIRCRAFT FAN BLADE ARRANGEMENTS," the disclosures of which are incorporated by reference herein in their entirety for all purposes.

FIELD

The described embodiments relate generally to an aircraft with vertical takeoff and landing capability. In particular, the embodiments provide an electric aircraft with one or more fixed vertical fans configured to generate vertical thrust while reducing aerodynamic drag during forward flight.

BACKGROUND

Aircraft with vertical takeoff and landing capability sometimes use vertical fans to generate vertical thrust for hover, vertical takeoff, and vertical landing. While the vertical fans are useful for generating vertical thrust, they may cause drag when not in use during other stages of flight, such as forward cruising flight.

Embodiments address these and other problems, individually and collectively.

SUMMARY

Described herein are examples (or embodiments) of an aircraft with at least one propulsion system with rotor blades configured to reduce aerodynamic drag when the propulsion system is deactivated. For example, a fixed vertical fan configured to provide vertical thrust may be powered down or deactivated during forward flight, and may cause drag on the aircraft. To reduce the amount of drag, the rotor blades can be locked into an acrodynamic position. Additionally, the rotor blades of the vertical fan (e.g. vertical propeller) can be configured to have angular positions that reduce drag. For example, the rotor blades as a group may be configured to generally face more forward and/or backward, and less to the side. There may be smaller angles between rotor blades in the front and back of the vertical fan, and larger angles to the sides of the vertical fan.

Embodiments provide an aircraft comprising a fuselage, a pair of wings coupled to opposite sides the fuselage, and a first set of one or more propulsion systems coupled to the pair of wings. Each of the first set of one or more propulsion systems has a fixed vertical orientation, and each of the first set of one or more propulsion systems comprises a hub and a plurality of rotor blades coupled to the hub and configured to rotate about a vertical axis to generate vertical thrust. A first angle between a first set of two adjacent rotor blades of the plurality of rotor blades is an acute angle, and a second angle between a second set of two adjacent rotor blades of the plurality of rotor blades is an obtuse angle. The first angle is acute, the third angle is equal to the first angle, the second angle is obtuse, and the fourth angle is equal to the second angle. Each of the first set of one or more propulsion systems comprises a locking mechanism configured to retain the set of rotor blades at a predefined rotary position when the propulsion system is deactivated. The predefined rotary position be configured so that the first angle faces a direction of forward flight. The aircraft further comprises a second set of one or more propulsion systems coupled to the pair of wings, where each of the second set of one or more propulsion systems is configured to generate thrust According to further embodiments, the plurality of rotor blades includes a first rotor blade coupled to the hub, a second rotor blade coupled to the hub, adjacent to the first rotor blade, and spaced from the first rotor blade by the first angle, wherein the first set of two adjacent rotor blades includes the first rotor blade and the second rotor blade, a third rotor blade coupled to the hub, adjacent to the second rotor blade, and spaced from the second rotor blade by the second angle, wherein the second set of two adjacent rotor blades includes the second rotor blade and the third rotor blade, and a fourth rotor blade coupled to the hub, adjacent to the third rotor blade, spaced from the third rotor blade by a third angle, and spaced from the first rotor blade by a fourth angle, the third angle is equal to the first angle, and the fourth angle is equal to the second angle.

According to further embodiments, the predefined rotary position is configured so that the first angle is bisected by the direction of forward flight.

According to further embodiments, each of the plurality of sets of one or more custom charging parameters include a custom current amount for a corresponding battery submodule of the plurality of battery submodules.

According to further embodiments, the first set of one or more propulsion systems are configured to maintain the fixed vertical orientation during forward flight, and the first angle is configured to reduce drag.

According to further embodiments, the first angle is 40 degrees, the third angle is 40 degrees, the second angle is 140 degrees, and the fourth angle is 140 degrees.

According to further embodiments, the direction of forward flight is defined as 0 degrees, the first rotor blade has an angular position of 20 degrees as measured from the direction of forward flight, the second rotor blade has an angular position of 160 degrees as measured from the direction of forward flight, the third rotor blade has an angular position of 200 degrees as measured from the direction of forward flight, and the fourth rotor blade has an angular position of 340 degrees as measured from the direction of forward flight.

According to further embodiments, the first angle is 60 degrees, the third angle is 60 degrees, the second angle is 120 degrees, and the fourth angle is 120 degrees.

According to further embodiments, the direction of forward flight is defined as 0 degrees, the first rotor blade has an angular position of 30 degrees as measured from the direction of forward flight, the second rotor blade has an angular position of 150 degrees as measured from the direction of forward flight, the third rotor blade has an angular position of 210 degrees as measured from the direction of forward flight, and the fourth rotor blade has an angular position of 330 degrees as measured from the direction of forward flight.

According to further embodiments, the first angle is less than 60 degrees, the third angle is 60 degrees, the second angle is more than 120 degrees, and the fourth angle is more than 120 degrees.

According to further embodiments, the direction of forward flight is defined as 0 degrees, and wherein each of the set of rotor blades have respective angular positions that are within a first range of 320 degrees and 40 degrees, or within a second range of 220 degrees and 140 degrees.

According to further embodiments, the direction of forward flight is defined as 0 degrees, and wherein each of the set of rotor blades have a respective angular position that is within a first range of 330 degrees and 30 degrees, or within a second range of 210 degrees and 150 degrees.

According to further embodiments, the first angle and the second angle are adjacent and supplementary angles, the second angle and the third angle are adjacent and supplementary angles, the third angle and the fourth angle are adjacent and supplementary angles, the fourth angle and the first angle are adjacent and supplementary angles, the first angle and the third angle are opposite angles, and the second angle and the fourth angle are opposite angles.

According to further embodiments, the fixed vertical orientation and the fixed horizontal orientation are orthogonal.

According to further embodiments, the fixed vertical orientation is orthogonal to the ground during forward flight, the fixed horizontal orientation is orthogonal to the ground during forward flight, and the fixed horizontal orientation is parallel to the direction of forward flight.

According to further embodiments, each of the first set of one or more propulsion systems further comprises a rotor comprising the hub and the set of rotor blade, and an electric motor configured to drive the rotor.

According to further embodiments, each of the second set of one or more propulsion systems comprises a rotor comprising the hub and the set of rotor blades, and the set of rotor blades includes a first rotor blade coupled to the hub; a second rotor blade coupled to the hub, adjacent to the first rotor blade, and spaced from the first rotor blade by a first angle; a third rotor blade coupled to the hub, adjacent to the second rotor blade, and spaced from the second rotor blade by a second angle; a fourth rotor blade coupled to the hub, adjacent to the third rotor blade, spaced from the third rotor blade by a third angle; and a fifth rotor blade coupled to the hub, adjacent to the fourth rotor blade, spaced from the fourth rotor blade by a fourth angle, and spaced from the first rotor blade by a fifth angle, where the first angle, the second angle, the third angle, the fourth angle, and the fifth angle are all equal.

According to further embodiments, the aircraft further comprises a control system configured to control the first set of one or more propulsion systems and the second set of one or more propulsion systems independently from one another.

According to further embodiments, the aircraft further comprises one or more battery units including configured to power the first set of one or more propulsion systems and the second set of one or more propulsion systems.

According to further embodiments, the aircraft further comprises a plurality of support structures coupled to an underside of the pair of wings, each support structure having a forward portion extending forward of the pair of wings and an aft portion extending aft of the pair of wings.

According to further embodiments, each of the first set of one or more propulsion systems and each of the second set of one or more propulsion systems are coupled to the forward portion or the aft portion of one of the plurality of support structures According to further embodiments, the pair of wings are coupled to an upper portion of the fuselage in a high-wing configuration Embodiments also provide a method comprising operating, by the control system, the first set of one or more propulsion systems, and operating, by the control system, the second set of one or more propulsion systems.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings. In the appended figures, similar components or features may have the same reference label. Further, various components of the same or similar type may be distinguished by following the reference label by a dash and a second label that distinguishes among the similar components.

FIGS. 1A-1B depict planar and top views an exemplary aircraft, according to embodiments.

FIGS. 2A-2B depict planar and top views an exemplary aircraft with tilting fans, according to embodiments.

DETAILED DESCRIPTION

Figure 3A:
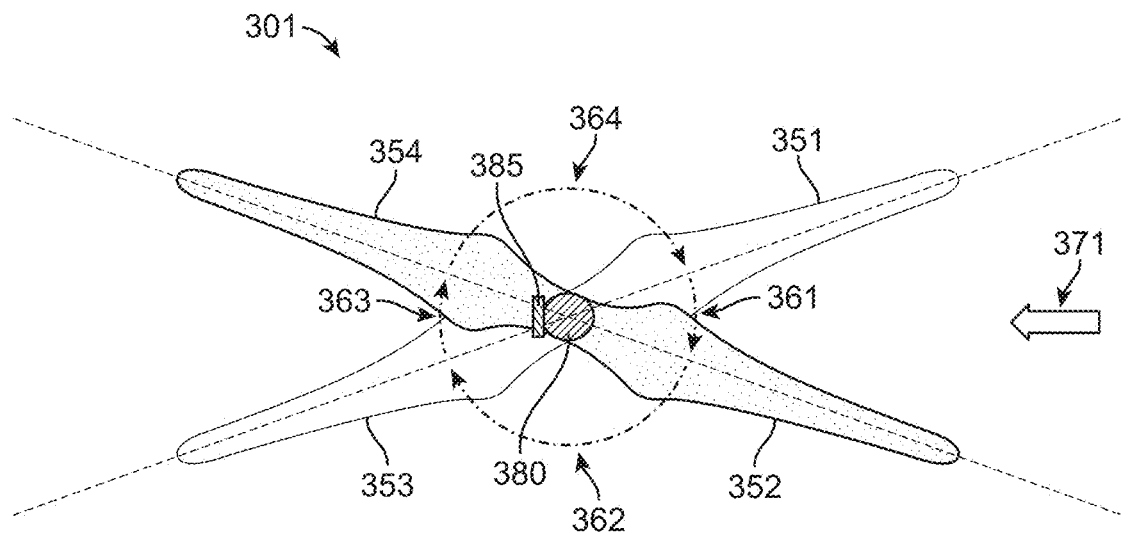
FIGS. 3A-3B illustrates two top-down views of an exemplary configurations of rotor blades, according to embodiments.

Techniques disclosed herein relate generally to an aircraft with at least one propulsion system with rotor blades configured to reduce aerodynamic drag when the propulsion system is deactivated. For example, a fixed vertical fan configured to provide vertical thrust may be powered down or deactivated during forward flight, and may cause drag on the aircraft. To reduce the amount of drag, the rotor blades can be locked into an aerodynamic position, and prevented from passively spinning. Additionally, the rotor blades can be configured to have angular positions that reduce drag. For example, when locked into a fixed position, the rotor blades as a group may be configured to generally face more in a forward direction and/or a backward direction, and less to the side. There may be smaller angles between rotor blades in the front and back of a vertical fan, and larger angles to the sides of a vertical fan. Rotor blades with angular positions toward the front (e.g., close to 0 degrees) may be equally spaced from the forward direction, such as 20 degrees to either side. In other words, a forward-facing angle between two rotor blades may be bisected by the direction of flight. One or more additional propulsion systems may generate forward thrust while the fixed vertical fans are deactivated. Various embodiments are described herein, including methods, processes, systems, devices, and the like.

FIGS. 1A and 1B depict planar and top views of an exemplary aircraft 100, according to embodiments. The aircraft 100 can be any suitable type of flying vehicle, such as an airplane, a helicopter, a drone or a hybrid-type flying vehicle. In some embodiments, the aircraft 100 may be capable of vertical take-off and landing (VTOL). The aircraft 100 can be configured for human piloting, remote piloting, and/or autonomous flight.

In the example shown, aircraft 100 includes a fuselage 104 that may include a cabin section (e.g., toward the nose) for carrying passengers and/or cargo. A pair of wings including a first wing 102 and a second wing 103 can be mounted on or otherwise attached to the fuselage 104. The pair of wings can be coupled to opposite sides of the fuselage, and can take any suitable shape and configuration. For example, the pair of wings can be rectangular straight wings, tapered straight wings, rounded or elliptical straight wings, swept wings, delta wings, or any other suitable type of wing. In some embodiments, the first wing 102 and the second wing 103 may be coupled to the fuselage 104 in a high-wing configuration. That is, the first wing 102 and the second wing 103 may be mounted on an upper portion of the fuselage 104, as shown in FIGS. 1A-1B.

The aircraft 100 can also include support structures 106 (A)-(F), which may be coupled to the wings 102, 103. As shown in FIGS. 1A-1B, each of the support structures 106(A)-(F) may take the form of a boom, though embodiments include any other suitable structure. Six support structures 106(A)-(F) are shown in FIGS. 1A-1B, where three support structures 106(A)-(F) are provided under each of the pair of wings 102, 103. The support structures 106(A)-(F) may be coupled to the undersides of the pair of wings, and may include a forward portion extending forward beyond the wing and an aft portion extending aft of the wing.

In some embodiments, each of the support structures 106(A)-(F) are identical, and therefore the support structures 106(A)-(F) may be interchangeable between the positions on the wings. For example, a first support structure 106(A) closer to the fuselage may be interchangeable with an adjacent second support structure 106(B) (e.g., the middle boom on the wing) or a further third support structure 106(C) (e.g., the boom furthest away from the fuselage).

Propulsion Systems

The aircraft 100 can also include propulsion systems 101(A)-(L). While twelve propulsion systems 101(A)-(L) are shown in FIGS. 1A-1B, any suitable number of propulsion systems 101(A)-(L) can be included. The propulsion systems 101(A)-(L) may be coupled to the pair of wings 102, 103, and may be divided equally between the wings. In some embodiments, as shown in FIGS. 1A-1B, one or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings. The number of booms and/or propulsion systems may vary according to the flight needs and requirements of the aircraft 100.

According to various embodiments, each of the propulsion systems 101(A)-(L) may be configured to provide thrust to the aircraft 100. The thrust from one or more of the propulsion systems 101(A)-(L) can be used to move, control, and/or stabilize the aircraft 100. The propulsion systems 101(A)-(L) can take the form of any suitable mechanism for providing thrust. In one example, a propulsion system may include a rotor (e.g., a fan). A propulsion system can also include a drive mechanism for the rotor, such as a dedicated electric motor (e.g., in the case of electric vehicles).

A rotor may comprise any suitable number of rotor blades (e.g., 2 blades, 3 blades, 4 blades, 5 blades, 6 blades, 7 blades, or 8 blades). The rotor blades may have a predetermined angle of attack. In some embodiments, all rotor blades may have the same angle of attack. In other embodiments, at least two rotor blades may have different angles of attack than each other. The rotor blades may be spaced equally or unequally. The rotor may further comprise a hub. The rotor blades may be attached to the hub. In some embodiments, the rotor blades and an integral hub may be manufactured as a single piece. The hub provides a central structure to which the rotor blades connect, and in some embodiments is made in a shape that envelops the motor.

In some embodiments the motor parts are low-profile so that the entire motor fits within the hub of the rotor, presenting lower resistance to the air flow when flying forward. The rotor can be attached to the rotating part of the motor. The stationary part of the motor can be attached to a support structure. In some embodiments the motor can be a permanent magnet motor and can be controlled by an electronic motor controller. The electronic motor controller can send electrical currents to the motor in a precise sequence to allow the rotor to turn at a desired speed or with a desired torque.

Propulsion System Orientation-Vertical and Horizontal

According to various embodiments, one or more of the propulsion systems 101(A)-(L) may be positioned, oriented, and/or otherwise configured to provide thrust and/or movement to the aircraft 100 in a predefined direction. For example, one or more of the propulsion systems 101(A)-(L) may be configured to provide thrust upward in a vertical direction. As shown in FIGS. 1A-1B, these can include propulsion systems 101(A), 101(D), 101(E), 101(F), 101 (G), 101(J), 101(K), and/or 101(L). Propulsion systems that are configured to provide thrust in a vertical direction may also be referred to as vertical fans or lift fans. Vertical fans may be used to generate vertical thrust (e.g., lift) for taking off, landing, hovering, stabilizing, and/or controlling the aircraft 100.

A vertical direction may be defined relative to the body of the aircraft 100. For example, a vertical direction can be the aircraft's vertical axis or z-axis (e.g., the plumb line that intersects the zenith and is orthogonal to the ground when the aircraft 100 is on the ground at rest, or hovering just above the ground). In some embodiments, the vertical direction may be orthogonal to the ground when the aircraft 100 is on the ground at rest and/or in a stable hover just above the ground in a level orientation. If the aircraft 100 is tilted, the aircraft's z-axis (and the vertical direction) may no longer be orthogonal to the ground. Vertical thrust may be thrust in a vertical direction (e.g., up or down).

Vertical thrust can be achieved by installing the vertical fans and/or their corresponding support structures 106(A)-(F) so that the rotational axis of each of the vertical fans is parallel with the vertical direction and/or orthogonal to a direction of forward flight. In other words, the vertical fans may be oriented such that their rotor blades rotate within a horizontal plane (e.g., a plane that is horizontal relative to the fuselage, or a plane defined by the x-axis and y-axis of the aircraft 100) and about the vertical axis (e.g., the z-axis of the aircraft 100). In some embodiments, the vertical fans may be configured so that each set of rotor blades rotate within the same plane. In other embodiments, the vertical fans may be configured so that one or more of the sets of rotor blades rotate within different planes (e.g., parallel planes).

In other embodiments, some or all of the vertical fans are oriented at an angle, so that on an individual level, one or more vertical fans have rotor blades that do not rotate within a horizontal plane, and do not provide thrust that is completely vertical, but instead provide thrust in a direction that is angled relative to vertical. However, in combination, a set of angled vertical fans can together provide a net thrust in the vertical direction. For example, a non-vertical thrust component provided by an angled vertical fan on the first wing 102 can be counteracted by an equal and opposite non-vertical thrust component provided by an oppositely angled vertical fan on the second wing 103.

In some embodiments, two adjacent vertical fans may have their blades mounted with opposite angles of attack such that their rotor blades spin in opposite directions. Adjacent vertical fans may refer to two vertical fans (e.g., 101A and 101D) that are coupled to opposite ends of the same support structure 106(A), or two vertical fans (e.g., 101A and 101B) that are on different support structures, or two vertical fans (e.g., 101A and 101G) that are on different wings.

According to various embodiments, a first subset of vertical fans may spin in a first direction, and a second subset (e.g., remainder) of vertical fans may spin in a second direction, opposite to the first direction. Configuring the vertical fans so that some spin in a first direction and other spin in an opposite second direction can advantageously cancel out any angular momentum created by the spinning blades so that the aircraft 100 can hover in a stable manner without rotating.

Further, rotational movement about the vertical axis of the aircraft 100 (e.g., yaw) can be performed when desired by temporarily reducing the spin rotational rate of some or all a first subset of vertical fans spinning in a first direction, and/or by temporarily increasing the spin rotational rate of a second subset of the vertical fans spinning in a second direction so that the total angular momentum created by the spinning blades does not cancel out. Accordingly, the aircraft 100 can rotate with the use of vertical fans without needing another source of thrust oriented in another direction.

According to various embodiments, one or more of the propulsion systems 101(A)-(L) may be configured to provide thrust forward in a horizontal direction. As shown in FIGS. 1A-1B, these can include propulsion systems 101(B), 101(C), 101(H) and/or 101(I). Propulsion systems that are configured to provide thrust in a horizontal direction may also be referred to as horizontal fans or propellers. Horizontal fans may be used to provide horizontal thrust for forward flight, climb, descent, and/or cruise. As shown in FIGS. 1A-1B, two propulsion systems of the same type (e.g., two vertical fans) or of different types (e.g., one vertical fan and one horizontal fan) can be mounted on each of the support structures 106(A)-(F).

A horizontal direction may be defined relative to the body of the aircraft 100. For example, a horizontal direction can be the aircraft's forward axis or x-axis. In some embodiments, the horizontal direction may be parallel to the ground when the aircraft 100 is on the ground at rest, in a stable hover just above the ground in a level orientation, and/or in a forward flight condition. If the aircraft 100 is tilted, the aircraft's x-axis (and the horizontal direction) may no longer be parallel to the ground. Horizontal thrust may be thrust in a horizontal direction (e.g., forward or backward).

Horizontal thrust (e.g., forward thrust) can be achieved by installing the horizontal fans and/or their corresponding support structures 106(B), 106(C), 106(E), and/or 106(F) so that the rotational axis of each of the horizontal fans is parallel with the horizontal direction and/or parallel to a direction of forward flight. In other words, the horizontal fans may be oriented such that their rotor blades rotate within a vertical plane (e.g., a plane defined by the z-axis and y-axis of the aircraft 100) and about the forward axis (e.g., the x-axis of the aircraft 100). In some embodiments, the horizontal fans may be configured so that each set of rotor blades rotate within the same plane. In other embodiments, the horizontal fans may be configured so that one or more of the sets of rotor blades rotate within different parallel planes.

In some embodiments, the horizontal fans may be configured to have the capability of spinning in either direction. As a result, the horizontal fans may be able provide a reverse thrust. A reverse thrust can be useful for moving the aircraft 100 in a backward direction (e.g., backing out of a hangar area from a hover position). Additionally, a reverse thrust can be used to reduce forward flight velocity. For example, reverse thrust from the horizontal fans can be used in instead of, or in addition to, flaps to slow the aircraft 100 and/or bring the aircraft 100 to a stationary hover.

In some embodiments, the horizontal direction and the vertical direction may be orthogonal to one another. Accordingly, vertical fans and horizontal fans may provide thrust in substantially orthogonal directions. In other embodiments, the vertical fans and horizontal fans may provide thrust that is about orthogonal or nearly orthogonal, but not exactly orthogonal. Isolating the directional thrusts into two separate types of components can beneficially simplify the control and design of the aircraft 100. In some embodiments, the horizontal fans and the vertical fans can be operated, powered on, and otherwise controlled independently from one another, thereby allowing thrust to be applied independently in the orthogonal directions (e.g., thrust can be applied in the different directions at the same time and at different times).

A combination of the horizontal fans and wings 102, 103 may achieve both forward movement and lift. In some embodiments, it may be more efficient to utilize the horizontal fans and wings 102, 103 to achieve vertical lift, instead of the vertical fans. Once the aircraft 100 reaches a sufficient speed (e.g., predetermined amount of speed, or a cruising speed) so that the wings provide sufficient lift to the aircraft 100, the vertical fans may no longer be needed to provide lift, and the vertical fans may temporarily stop operating. For example, the vertical fans may initially be active and generate vertical thrust to lift the aircraft 100. Once the aircraft 100 is off the ground and/or at a certain height, the horizontal fans can activate and/or increase the horizontal thrust so that the aircraft 100 gains horizontal velocity. The vertical fans may continue providing vertical lift while horizontal velocity increases, as the wings 102, 103 may not provide sufficient vertical lift until a predetermined speed (e.g., a cruising speed) is achieved. The vertical fans may eventually (or gradually) reduce their vertical thrust contribution as the wings 102, 103 gradually provide more (e.g., an increasing amount of) vertical lift during the increasing horizontal velocity. Later on, as the aircraft 100 slows or returns to a hover position, the vertical fans can reactivate and/or increase vertical thrust.

Propulsion System Orientation-Fixed and Tiltable

According to various embodiments, one or more of the propulsion systems 101(A)-(L) may have a fixed orientation. For example, one or more of the propulsion systems 101(A)-(L) may be mounted in a fixed orientation relative to a respective wing 102 or 103, a respective support structure 106(A)-(F), and/or the aircraft 100. While the rotor blades of a fixed propulsion system can rotate when activated, the orientation of the propulsion system housing and structure may not be rotatable with respect to the aircraft 100. As a result, a fixed propulsion system can be configured to provide thrust in a constant direction relative to the aircraft 100. The thrust direction and orientation of a fixed propulsion system relative to the aircraft 100 (e.g., the fuselage, wings, and/or support structures) may not change or move, regardless of the current aircraft 100 activities and/or direction of movement (e.g., both forward flight and vertical flight), according to embodiments.

In some embodiments, one or more vertical fans may have fixed orientations. For example, one or more of propulsion systems 101(A), 101(D), 101(E), 101(F), 101(G), 101(J), 101(K), and/or 101(L) may have fixed vertical orientations. These may be referred to as fixed vertical fans.

Further, according to some embodiments, one or more of the horizontal fans may have fixed orientations. For example, propulsion systems 101(B), 101(C), 101(H) and/or 101(I) may have fixed horizontal orientations. These may be referred to as fixed horizontal fans.

In some embodiments, all of the propulsion systems 101(A)-(L) may have fixed orientations. As a result, the vertical fans and the horizontal fans may be permanently configured to provide thrust in orthogonal (or substantially orthogonal) directions.

In other embodiments, one or more of the propulsion systems 101(A)-(L) may be configured to change orientation. For example, one or more of the propulsion systems 101(A)-(L) may be mounted in a manner that allows the orientation to be tiltable relative to a respective wing 102 or 103, a respective support structure 106(A)-(F), and/or the aircraft 100. As a result, a tilting propulsion system, which may be referred to as a tilting fan, can be configured to provide thrust in more than one direction relative to the aircraft 100. A tilting fan may be coupled to a respective support structure 106(A)-(F) via one or more tilting mechanisms including, for example, a motor and a coupling mechanism. A tilting mechanism may be controllable and/or configured to change or move the orientation and thrust direction of a tilting fan relative to the aircraft 100 (e.g., the fuselage, wings, and/or support structures) based on current aircraft 100 activities, needs, and/or direction of movement (e.g., forward flight, vertical flight), according to embodiments.

As discussed above, propulsion systems 101(B), 101(C), 101(H) and/or 101(I) may take the form of fixed horizontal fans. However, in other embodiments, one or more of propulsion systems 101(B), 101(C), 101(H) and/or 101(I) may instead take the form of tilting fans. Such tilting fans may be configured to switch (e.g., rotate or tilt) between a horizontal orientation (also referred to as a horizontal direction or forward flight position) and a vertical orientation (also referred to as vertical direction or vertical flight position). FIGS. 1A-1B illustrate the tilting fans as currently set to a horizontal orientation. FIGS. 2A-2B illustrate the tilting fans as currently set to a vertical orientation.

As shown in FIGS. 2A-2B, all of the propulsion systems 101(A)-(L) may have a vertical orientation. Some of these may be vertical fans with a fixed vertical orientation (e.g., propulsion systems 101(A), 101(D), 101(E), 101(F), 101 (G), 101(J), 101(K), and/or 101(L)), while others may be tilting fans that are currently and temporarily set to have a vertical orientation (e.g., propulsion systems 101(B), 101 (C), 101(H) and/or 101(I)). The tilting fans may have an orientation that is the same as or similar to that of the vertical fans.

Tilting fans can be controlled to switch between the horizontal orientation and the vertical orientation to provide additional thrust in either direction, depending on current movement needs of aircraft 100. For example, during take-off, landing, and/or hovering, one or more tilting fans may be set to a vertical orientation to provide additional vertical thrust. During forward flight, forward acceleration, and/or deceleration, one or more tilting fans may be set to a horizontal orientation to provide horizontal thrust.

Embodiments allow the aircraft 100 to include any suitable combination and number of tilting fans, fixed horizontal fans, and/or fixed vertical fans. Also, each type of fan can be located at any suitable position along the wings 102, 103 and/or at any suitable support structure 106(A)-(F). Additional examples of configurations of a group of propulsion systems 101(A)-(L) are discussed below with respect to FIGS. 4-5.

While tilting fans can provide the ability to increase thrust in a specific direction as desired, it can be beneficial to incorporate one or more propulsion systems with fixed orientations in order to reduce weight, reduce moving parts, reduce possible failure points, and/or reduce maintenance concerns.

Rotary Position

When a propulsion system is depowered, it may cause some amount of drag (also referred to as air resistance or wind resistance) on the aircraft 100. For example, during forward flight, one or more fixed vertical fans may be depowered so that the rotor blades are deactivated, as the fixed vertical fans may not currently be needed to provide vertical thrust (e.g., due to the current stage of forward flight), and they may not be configured to contribute forward thrust or movement (e.g., due to providing thrust in a direction that is orthogonal to currently needed direction of thrust). Similarly, during vertical flight, horizontal fans may not be supplied power for rotating.

When depowered, fixed vertical fans may still remain attached to the support structures, wings, and/or aircraft, and thus exposed to the air. One or more of the rotor blades may have a surface that is exposed to the direction of relative air currents caused by the forward movement of the aircraft 100. Drag may be produced when air flows into and across one or more rotor blades. The drag may cause some of the aircraft 100 momentum and energy to dissipate. Tilting fans may not cause drag in this way, as they can tilt to the horizontal orientation and be actively used to provide forward thrust, instead of remaining passive during forward flight.

To compensate for drag, the aircraft 100 may provide extra forward thrust (e.g., via one or more horizontal fans or tilting fans). While the aircraft 100 can compensate and maintain flight, it may involve using additional energy reserves. Thus, while it is advantageous to configure the vertical fans as fixed propulsion systems (e.g., as opposed to tilting fans) in order to reduce complexity and weight, fixed vertical fans may cause a reduction in energy efficiency due to drag.

Embodiments provide configurations that improve efficiency by reducing the drag caused by deactivated rotor blades. One or more propulsion systems 101(A)-(L) may be configured so that deactivated rotor blades maintain a position that minimizes drag.

A rotary position may be the current rotational position of a set of rotor blades. As a set of rotor blades of a propulsion system 101(A)-(L) spin, it rotates through various rotary positions. Examples of rotary positions are 0 degrees, 45 degrees, 90 degrees, 180 degrees, 270 degrees, 360 degrees, etc.

According to embodiments, a set of rotor blades may be held still and prevented from passively spinning when a given propulsion system is not currently being powered or used. For example, the rotor blades of one or more fixed vertical fans (e.g., propulsion systems 101(A), 101(D), 101(E), 101(F), 101(G), 101(J), 101(K), and/or 101(L)), may remain stationary when the vertical fans are deactivated or otherwise not being actively used to provide vertical thrust, such as during forward cruising flight. The rotor blades may be controlled to maintain a fixed rotary position (also referred to as a locked rotary position or stationary rotary position). This may be accomplished through any suitable locking mechanism 385. For example, a locking mechanism 385 can comprise one or more of a brake, latch, cam, lever, wedge, ratchet, spline, and/or grooves disposed on the rotor, a rotating part of the motor, a stationary part of the motor, or otherwise coupled to the set of rotor blades.

The locked rotary position can be a predefined rotary position. Instead of the locked rotary position being a rotary position where a spinning set of rotor blades happen to come to rest, or otherwise a random rotary position, the rotor blades can be controlled so that they come to rest at a specific predefined rotary position.

According to embodiments, the predefined rotary position can be chosen that reduces or minimizes the drag caused by deactivated rotor blades. For example, drag may be reduced by selecting a rotary position that reduces the amount of rotor blade surface area that is exposed to oncoming air (e.g., due to forward movement of the aircraft). When an individual rotor blade points forward or backward (e.g., parallel or anti-parallel to the x-axis or direction of forward flight), it becomes more aerodynamic as less surface area opposes the airflow. In other words, the cross-section of rotor blade surface orthogonal to the direction of airflow is reduced.

For a set of rotor blades with different angular positions, pointing a first rotor blade directly forward may cause a second rotor blade to have larger cross-section of surface area exposed to air resistance. It may be better to have a balance of a first amount of surface area exposed to drag on the first rotor blade with a second amount of surface area exposed to drag on the second rotor blade. Accordingly, the set of rotor blades may be considered as a whole when determining an optimally aerodynamic position. When a set of rotor blades, as a group, primarily point forward or backward (e.g., parallel or anti-parallel to the x-axis or direction of forward flight), they become more aerodynamic as less surface area opposes the air currents. The locked rotary position can be a predefined rotary position that minimizes the total surface area of a set of rotor blades that is exposed to air/wind currents caused by forward flight of the aircraft.

Within a plane defined by a vertical fan's set of rotating rotor blades, 0 degrees can be the forward direction (e.g., parallel to the direction of forward flight, or parallel to the aircraft's x-axis). 180 degrees can be the reverse direction (e.g., opposite the forward direction). 90 degrees can be a sideways direction to the right (e.g., parallel the direction of the right wing, or parallel to the aircraft's y-axis). 270 degrees can be a sideways direction to the left (e.g., parallel the direction of the left wing, or antiparallel to the aircraft's y-axis). Within this framework, the predefined rotary position can be described as a rotary position of 0 degrees.

In addition to the rotary position, angular positions of each rotor blade can be described individually. It may be desirable to configure each of the rotor blades to be at rest within the range of 320 degrees and 40 degrees (e.g., forward facing) or within the range of 140 degrees and 220 degrees (e.g., backward facing) when the rotary position is locked. Further, it may be optimal to set the forward-facing rotor blades to have an average position of 0 degrees (e.g., a first rotor blade positioned at 330 degrees and a second rotor blade positioned at 30 degrees), and to set the backward-facing rotor blades to have an average position of 180 degrees (e.g., a third rotor blade positioned at 150 degrees and a fourth rotor blade positioned at 210 degrees).

Maximum drag may be produced when a maximum amount of surface area is exposed to air currents. The predefined rotary position may enable a measurable reduction in drag and energy usage when compared with the maximum drag. The reduction in drag may increase with aircraft speed, as drag generally increases with aircraft speed.

Rotor Blade Positions and Angular Spacing

Embodiments provide configurations of rotor blade positions and angular spacing that further reduce drag and improve efficiency. Rotor blades can be positioned and spaced around a hub in an unequal manner that decreases the surface cross-section exposed to airflow while in a locked rotary position.

FIG. 3A illustrates a top-down view (e.g., looking down a rotational axis) of an exemplary configuration of rotor blades of a propulsion system 301. The propulsion system 301, which may be the same as or similar to one or more of the propulsion systems 101(A)-(L), can include any suitable number of rotor blades. In this example, there is a first rotor blade 351, a second rotor blade 352, a third rotor blade 353, and a fourth rotor blade 354. Each of the rotor blades can be coupled to or structurally integrated with a central hub 380. Together, the rotor blades and hub 380 may form a rotor that rotates when driven by an electric motor. The hub 380 may be the center of rotation for the rotor.

In some embodiments, each of the rotor blades can be individual structures that are coupled together at the hub 380. In other embodiments, two rotor blades may be structurally integrated into one elongated rotor blade that extends through the hub 380 from two sides. For example, the first rotor blade 351 and the third rotor blade 353 may be integrated into a single structure, so that they are two sides of a single structure. Similarly, the second rotor blade 352 and the fourth rotor blade 354 may be integrated into another single structure. In that case, the two individual structures can be coupled together at the hub 380.

Each rotor blade may have a fixed angular position on the hub 380. Within the perspective illustrated in FIG. 3A, the angular position of 0 degrees may extend from the hub 380 directly to the right. This may be the direction of forward flight, which is opposite the airflow direction 371. Similarly, the angular position of 180 degrees may extend from the hub 380 to the left, the angular position of 90 degrees may extend downward from the hub 380, and the angular position of 270 degrees may extend upward from the hub 380.

These angular positions stay fixed relative to the hub 380. Thus, even when the hub 380 and rotor blades spin, the angular positions of the rotor blades (on the hub) stay the same. This is in contrast with the rotary position of the rotor as a whole, which changes when the rotor (e.g., hub and rotor blades) spins. The current rotary position as shown in FIG. 3A can be described as 0 degrees. A clockwise quarter turn would result in a rotary position of 90 degrees.

With this frame of reference, in FIG. 3A, the first rotor blade 351 may have an angular position of 340 degrees, the second rotor blade 352 may have an angular position of 20 degrees, the third rotor blade 353 may have an angular position of 160 degrees, and the fourth rotor blade 354 may have an angular position of 200 degrees.

Each adjacent pair of rotor blades is separated by a fixed, predefined angle (which may also be referred to as an inter-blade angle). The angle between two rotor blades may be formed and measured at an intersection of centerlines of the rotor blades (which may also overlap with a central point of the hub 380). The first rotor blade 351 and the second rotor blade 352 may be separated by a first angle 361. The second rotor blade 352 and the third rotor blade 353 may be separated by a second angle 362. The third rotor blade 353 and the fourth rotor blade 354 may be separated by a third angle 363. The fourth rotor blade 354 and the first rotor blade 351 may be separated by a fourth angle 364.

As shown in FIG. 3A, in some embodiments, the first angle 361 and the third angle 363 can be equal. Also, the second angle 362 and the fourth angle 364 can be equal. In other words, a first pair of opposite angles can match one another, and a second pair of opposite angles can match one another.

In some embodiments, the first angle 361 and/or the third angle 363 may be acute angles (e.g., less than 90 degrees). Also, the second angle 362 and the fourth angle 364 can be obtuse angles (e.g., greater than 90 degrees). In the example shown in FIG. 3A, the first angle 361 can be 40 degrees, the second angle 362 can be 140 degrees, third angle 363 can be 40 degrees, and the fourth angle 364 can be 140 degrees. Other angles can be utilized to achieve uneven spacing between rotor blades. For example, the first angle 361 can be any angle less than 90 degrees and greater than 1 degree. Another specific example, is discussed below with respect to FIG. 3B.

The sum of all of the angles is 360 degrees, in some embodiments. Additionally, the sum of two adjacent angles is 180 degrees (e.g., the sum of the first angle 361 and the second angle 362). In other words, each pair of two adjacent angles can be supplementary angles.

A typical set of rotor blades may be equally spaced. For example, horizontal fans and/or tilting fans (e.g., as shown in FIGS. 1 and 2) may have 2 or more blades (e.g., 5 blades) separated by equal angles (e.g., 72 degrees). However, embodiments can utilize unequally spaced rotor blades to reduce unwanted drag. As discussed above, airflow that moves orthogonally across deactivated and/or locked rotor blades may cause cross-drag, but the cross-drag can be reduced by minimizing the cross-section of airflow and rotor blade surfaces. Accordingly, rotor blade positions and angles 361-364 can be configured to reduce the cross-section (e.g., a 2-dimensional projection of the rotor blade onto a plane that is orthogonal to the airflow) in combination with the predefined locked rotary position.

For example, in FIG. 3A which can be a top-down perspective of the rotor blades 351-354 of a fixed vertical fan (e.g., which may be coupled to an aircraft), the airflow direction 371 shows that the air is coming from the right side of the page. This can indicate that the aircraft 100 has a direction of travel toward the right, opposite (e.g., anti-parallel to) the airflow direction 371. When the fixed vertical fan is deactivated, it may be locked in the shown predefined rotary position, which may be referred to as a forward-facing rotary position of 0 degrees.

In this locked rotary position of 0 degrees, the rotor blades can be substantially facing forward and/or backward, as a group. This can mean arranging the rotor blades so that the smaller angles (e.g., acute angles) are facing toward the wind, while the larger angles (e.g., obtuse angles) are facing to the side. For example, the first angle 361 may face the direction of forward flight. Additionally, this can mean that the first angle 361 and/or the third angle 363 are bisected by the airflow direction 371. In other words, a bisecting line for the first angle 361 may be parallel to the airflow direction 371 or the direction of aircraft travel (e.g., forward flight). A locked rotary position of this nature can minimize the total cross-section of the group of rotor blades 351-354 that is orthogonal to airflow, so that exposure to airflow is reduced, aerodynamics is improved, and drag is reduced.

In the case where the first angle 361 is 40 degrees, a locked rotary position that causes the first angle 361 to be bisected by the airflow direction 371 means that the first rotor blade 351 is positioned to point 20 degrees to the left (e.g., counterclockwise) of the 0 degree forward direction, and the second rotor blade 352 is positioned to point 20 degrees to the right (e.g., clockwise) of the 0 degree forward direction. Similarly, in the case where the third angle 363 is 40 degrees, a locked rotary position that causes the third angle 363 to be bisected by the airflow direction 371 means that the third rotor blade 353 is positioned to point 20 degrees to the left (e.g., counterclockwise) of the 180 degree backward direction, and the fourth rotor blade 354 is positioned to point 20 degrees to the right (e.g., clockwise) of the 180 degree backward direction. Thus, each of the rotor blades 351-354 are spaced 20 degrees from a line created by the wind direction 371.

As mentioned above, it may be optimal to set the forward-facing rotor blades to have an average position of 0 degrees, and to set the backward-facing rotor blades to have an average position of 180 degrees. These specifications are satisfied by the example shown in FIG. 3A where rotor blades positioned at 20 degrees and 340 degrees average to 0 degrees, and the rotor blades positioned at 160 degrees and 200 degrees average to 180 degrees. Additionally, as mentioned above, it may be desirable to set the locked rotary position so that the each of the rotor blades are at rest within the range of 320 degrees and 40 degrees (e.g., forward facing) or within the range of 140 degrees and 220 degrees (e.g., backward facing). These specifications are also satisfied by the example shown in FIG. 3A where rotor blades are positioned at 20 degrees, 160 degrees, 200 degrees, and 340 degrees, respectively.

In contrast, for a set of 4 rotors that are each spaced by equal angles of 90 degrees, there will always be two rotor blades that are angled at least 45 degrees from the wind direction 371, causing more drag. Thus, as compared to an equal spacing of rotor blades, the angles 361-365 in FIG. 3A can reduce cross-drag and improve aerodynamics when used in combination with the cross-section minimizing locked rotary position. For example, at some practical airspeeds, this configuration can cause a cross-drag of 38 Newtons, which is a reduction of 44 Newtons when compared to a cross-drag of 82 newtons caused by a set of 4 rotors that are each spaced by angles of 90 degrees.

In some situations, equally spaced rotor blades with equal angles may produce the most thrust. As a result, unequal or varied angles may reduce the amount of thrust produced by a given propulsion system. It may be undesirable to utilize angles that are below a given threshold (e.g., depending on the number of rotor blades and/or the number of propulsion systems), such as 10 degrees. While a smaller angle can further reduce drag, it may no longer provide sufficient thrust.

The angles 361-364 may be configured to both reduce drag while still providing sufficient thrust. For example, it may be preferred to configure the angular position of each rotor blade so that it is less than a predefined threshold angle from the airflow direction (e.g., within 45 degrees, 40 degrees, 35 degrees, 30 degrees, or 25 degrees) to reduce drag. It also may be preferred to configure each angle to be greater than a predefined minimum threshold (e.g., 5 degrees, 10 degrees, 20 degrees, etc.) to provide sufficient thrust. In the case where an acute angle is centered around the airflow direction 371 (e.g., so that the airflow direction bisects the acute angle), it may be preferred to configure each acute angle (e.g., the angles 361 and 363) to be less than a predefined maximum threshold (e.g., 90 degrees, 80 degrees, 70 degrees, 60 degrees, 50 degrees, etc.) to reduce drag, and to configure each acute angle to be more than a predefined minimum threshold (e.g., 5 degrees, 10 degrees, 20 degrees, 30 degrees, etc.) to provide sufficient thrust.

According to embodiments, horizontal fans and/or tilting fans may have rotor blades that are equally spaced, with equal angles between each pair of rotor blades. Horizontal fans and tilting fans may not be subject to cross-drag during forward flight, as they may instead be oriented horizontally during forward flight and/or operated to produce forward thrust during forward flight. Accordingly, for such propulsion systems, because there may be no need to reduce cross-drag, it may be preferred to provide equally-spaced rotor blades to achieve maximum horizontal thrust.

Figure 3B:
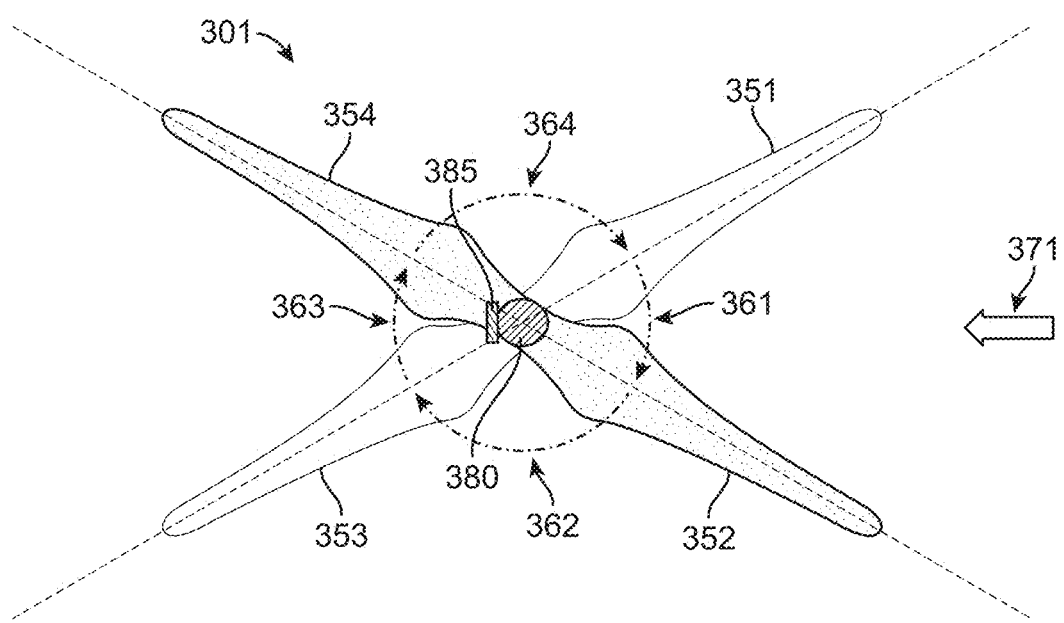

FIG. 3B illustrates a top-down view of another exemplary configuration of rotor blades of a propulsion system 301. FIG. 3B is similar to FIG. 3A, except the angles 361-365 and the angular positions of rotor blades 351-354 are modified. The acute angles 361 and 363 are slightly larger in FIG. 3B than in FIG. 3A, and the obtuse angles 362 and 364 are slightly smaller. The acute angles 361 and 363 are still centered around the direction of flight, and bisected by the airflow direction 371. As a result, the rotor blades 351-354 have angular positions that are slightly further from center (e.g., further from 0 degrees, or further from 180 degrees). For example, the first rotor blade 351 may have an angular position of 330 degrees, the second rotor blade 352 may have an angular position of 30 degrees, the third rotor blade 353 may have an angular position of 150 degrees, and the fourth rotor blade 354 may have an angular position of 210 degrees. It follows that the first angle 361 the third angle 363 can each be 60 degrees, while the second angle 362 and the fourth angle 364 can each be 120 degrees. Accordingly, with respect to the configuration of FIG. 3A, the configuration of FIG. 3B has less disparity between the sizes of the acute angle and the obtuse angle. This may produce greater thrust when the vertical fans are operated, but also greater cross-drag when the vertical fans are deactivated and exposed to airflow during forward flight. However, the cross-drag can still be reduced relative to a set of rotor blades with equal spacing (e.g., all angles being 90 degrees). For example, at some practical airspeeds, this configuration can cause a cross-drag of 54 Newtons, which is a reduction of 28 Newtons when compared to a cross-drag of 82 newtons caused by a set of 4 rotors that are each spaced by angles of 90 degrees.

Embodiments advantageously reduce drag by utilizing set of rotor blades spaced by uneven angles, and rotor blades that are locked with a locking mechanism in a rotary position that increases aerodynamics. One or more propulsion systems can still provide sufficient thrust while also experiencing less drag, and thereby improve energy efficiency and reduce power needs. Further, this can be accomplished without requiring additional actuators, weight, or system complexities. For example, instead of utilizing movable or collapsible rotor blades that require mechanisms to adjust angular positions and distances (which increase aircraft weight, complexities, maintenance needs, and failure risks), a set of rotor blades with fixed, uneven angular positions and distances can achieve the reduced drag. Additionally, instead of utilizing a full set of tilting fans that each require mechanisms to adjust orientations (which increase aircraft weight, complexities, maintenance needs, and failure risks), one or more propulsion systems with fixed orientations (e.g., fixed vertical fans and/or fixed horizontal fans) can produce sufficient thrusts in multiple directions and be configured to experience less drag when not operating. Reductions in aircraft weight can further improve energy efficiency, and as a result, aircraft flight range. So, even if some drag is still caused by the rotor blade assemblies described herein, the loss of energy to drag may be less than or compensated for (e.g., with respect to collapsible rotor blades) by an energy savings due to overall weight reduction.

Further, embodiments can advantageously isolate vertical lift components and functions from horizontal thrust components and functions. Vertical fans can provide vertical lift for takeoff, landing, and hovering functions. Horizontal fans can provide forward thrust, and in combination with wings, lift during flight when sufficient velocity is attained. This configuration provides an aircraft that is functional and has simple, fixed components. Both vertical takeoff and rapid horizontal movement can be performed without needing any tilting or adjusting fans/propellers. This can enable simpler flight control, easier maintenance, and reduce moving parts which can be prone to failure. In other embodiments, one or more tilting fans may be utilized, while other propulsion systems remained fixed.

Further, embodiments provide redundancy. Vertical lift can be provided by vertical fans, as well as wings during forward movement. Additionally, overheating can be avoided, as various components can be disabled at certain times. The vertical fans can stop operating during forward flight, and the horizontal fans can stop operating during hovering, landing, and takeoff.

While specific examples of propulsion systems and rotor blade configurations are discussed and illustrated herein, any suitable number of propulsion systems can be included with any suitable combination of orientations and types. Additionally, propulsion systems can have different configurations and numbers of rotor blades. Each propulsion system can have any suitable number (e.g., 2, 3, 4, 5, 6, 7, 8, or more) of rotor blades with any suitable angular positions and angles. For example, with respect to FIGS. 3A and 3B, a 6-blade configuration can be formed by adding a fifth rotor blade can at an angular position of 0 degrees (e.g., between the fourth rotor blade 354 and the first rotor blade 351), and a sixth rotor blade can be added at an angular position of 180 degrees (e.g., between the second rotor blade 352 and the third rotor blade 353). Also, the locked rotary position can be any suitable position with respect to the wind direction and direction of travel (e.g., 0 degrees, 20 degrees, 45 degrees, 90 degrees, 180 degrees, etc.).

Referring back to FIGS. 1A-1B, according to various embodiments, the aircraft 100 may be an electrically powered aircraft or a hybrid-electric aircraft. One or more battery units may be included in the aircraft 100 (e.g., within the fuselage 104) and configured to provide power to various aircraft components, such as one or more electric motors and/or on-board computer systems. The propulsion systems 101(A)-(L) may be driven by electric motors that are powered by an electric power system including the one or more battery units. In some embodiments, each of the propulsion systems propulsion systems 101(A)-(L) may be coupled to a dedicated battery unit. Alternatively, there may be a one-to-many relationship between the one or more battery units and the propulsion systems 101(A)-(L). In some cases, one or more battery units may be the sole power source for the aircraft 100. Each battery unit may include one or more battery cells.

According to various embodiments, the aircraft 100 may include a control system 107, such as a flight control system, which is configured to control the aircraft 100. The control system 107 may be configurable to control the aircraft 100 automatically and/or remotely (e.g., via a control signal received from a remote entity, such as a remote controller, a remote pilot or a remote-control tower). In various embodiments, the control system 107 can include one or more computers with one or more non-transitory computer readable medium storing instructions, and one or more processors configured to execute the instructions in order to perform the processing and control functions described herein.

For example, the control system 107 may control when the propulsion systems 101(A)-(L) should be operated, and/or the amount of power provided to the propulsion systems 101(A)-(L). The control system 107 may be configurable to control the propulsion systems 101(A)-(L) independently from one another. According to various embodiments, the control system 107 may control the propulsion systems 101(A)-(L) based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

The flight control system 107 may also control one or more locking mechanisms 385 to retain one or more sets of rotor blades at specific, predefined locked rotary positions when not being used to provide thrust. In other embodiments, one or more locking mechanisms 385 may be passive mechanisms that automatically engage without instructions from the flight control system 107 when the propulsion system is deactivated.

The flight control system 107 may further control one or more tilting mechanisms to switch the positioning of one or more tilting fans from the forward flight position to the vertical position, as well as from the vertical position to the forward flight position. According to various embodiments, the control system (e.g., flight control system) may control the tilting fans between the two positions based on sensor data and/or flight data received from the sensors (e.g., sensor measuring air temperature, electric motor temperature, airspeed of the aircraft, etc.), computers, and other input/output devices coupled to the aircraft.

Accordingly, the control system 107 may be configured to translate pilot or other operator input, and/or corrections computed by an onboard computer, into forces and moments and/or to further translate such forces and moments into a set of actuator (e.g., vertical lift rotors; propellers; control surfaces, such as ailerons; etc.) and/or associated parameters (e.g., lift fan power, speed, or torque) to provide the required forces and moments. For example, pilot or other operator inputs may indicate a desired change in the aircraft's speed, direction, and/or orientation, and/or wind or other forces may act on the aircraft, requiring the propulsion systems and/or other actuators to be used to maintain a desired aircraft attitude (roll/pitch/yaw), speed, and/or altitude.

According to various embodiments, the control system 107 may be configurable to receive a flight instruction, such as a takeoff, hover, cruise or landing instruction. The control system 107 may then determine the current location and/or velocity of the aircraft 100, and then control the operation of the propulsion systems 101(A)-(L) based on the flight instruction. During the operation of the aircraft 100, the control system 107 may be configurable to continuously monitor the operational states of the propulsion systems 101(A)-(L) in view of the flight instruction.

The aircraft 100 can further include landing gear 130. The landing gear 130 can include any suitable combination of one or more skids, wheels, skis, pontoons, shock absorbers, struts, and/or any other suitable component for supporting the aircraft 100 when landing and/or landed on the ground.

In some embodiments, the landing gear 130 can be retractable into a compartment within the fuselage 104.

The aircraft 100 can include any other suitable control structures and control surfaces. Any suitable number of ailerons, rudders, elevators, slats, flaps, spoilers, and/or stabilizers can be included. For example, a horizontal stabilizer 140 (e.g., a tailplane) can be coupled to a rear end or tail of the fuselage 104. The horizontal stabilizer 140 may be in any suitable shape or form. For example, as shown in FIGS. 1A-1B, the horizontal stabilizer 140 may include two stabilizer surfaces protruding at horizontally from a tail. In some embodiments, each of the stabilizer surfaces can further include hinged control surfaces on the aft edges. Additionally, as shown in FIGS. 1A-1B, an additional (e.g., third) vertical stabilizer surface can be mounted on the tail, extending vertically upward and/or downward. Introducing the horizontal stabilizer 140 can provide additional stability and control of the aircraft 100. This can be especially useful during times when the vertical fans are disabled or otherwise not being utilized or relied on for control and stability (e.g., during cruising flight).

As discuss above, the propulsion systems 101(A)-(L) can include any suitable combination of fixed-orientation vertical fans, fixed-orientation horizontal fans, and/or tilting fans, and each type can be at any suitable location (e.g., any of the twelve locations labeled 101(A)-(L)). The type of propulsion system at each location may be selected to enhance any number of flight characteristics including forward thrust, vertical thrust, maneuverability, drag, and/or any similar flight characteristic.

In FIGS. 1A-1B, the propulsion systems have a mix of vertical orientations and horizontal orientations. As discussed above, in some embodiments, the propulsion systems at locations 101(A), 101(B), 101(D), 101(E), 101(G), 101(H), 101(J), and/or 101(K) may be fixed-orientation vertical fans, and the propulsion systems at locations 101(C), 101(F), 101(I) and/or 101(L) may be tilting fans.

Figure 4:
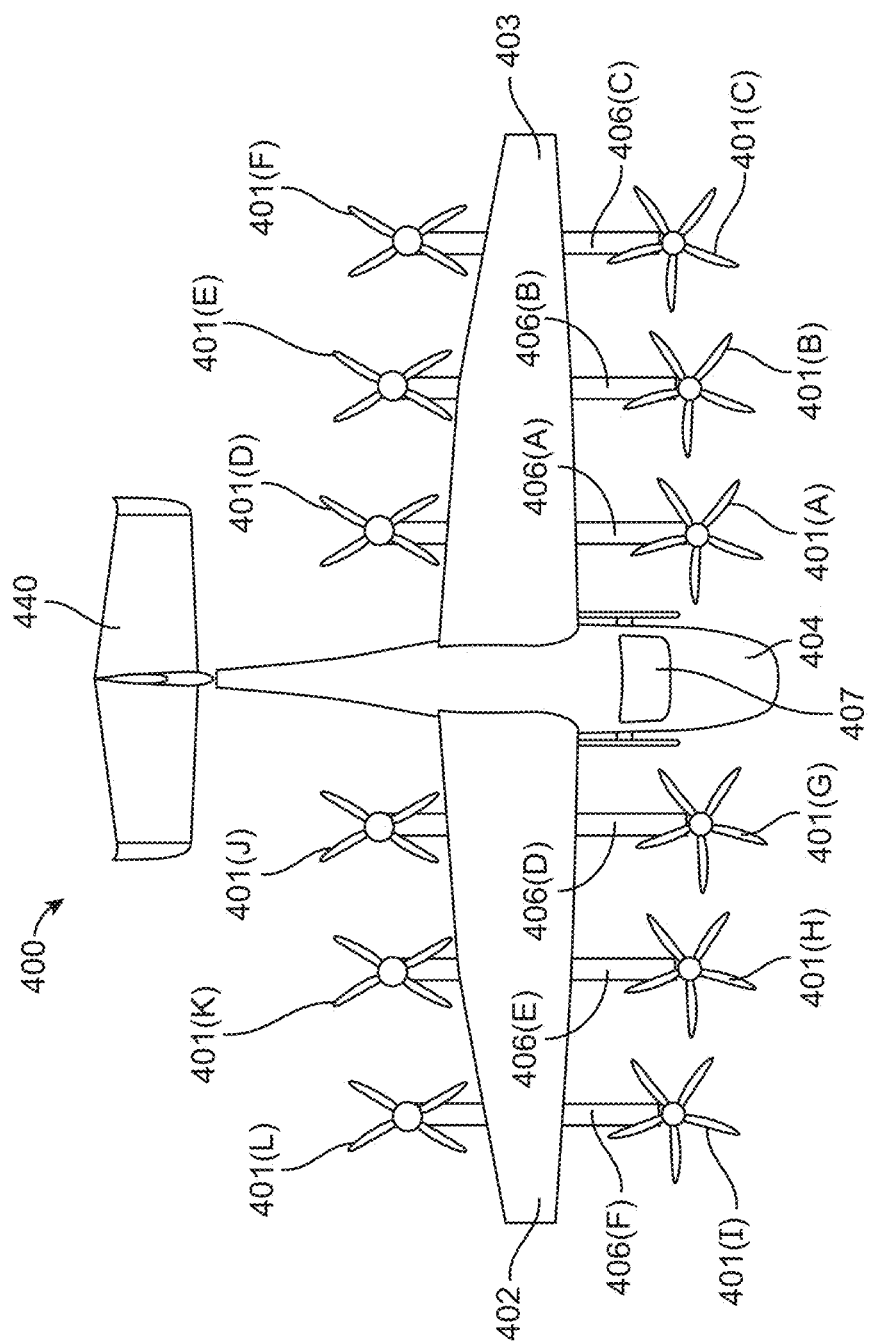
FIG. 4 illustrates an aircraft with an alternative arrangement of propulsion systems, according to various embodiments.

In FIG. 4 illustrates an aircraft 400 with another arrangement of propulsion systems 401(A)-(L). In this example, the propulsion systems at locations 401(D), 401(E), 401(F), 401(J), 401(K), and/or 401(L) may be fixed-orientation vertical fans, and the propulsion systems at locations 401(A), 401(B), 401(C), 401(G), 401(H), and/or 401(I) may be tilting fans. In other words, locations in the back row are vertical fans, while locations in the front row are tilting fans. In comparison with FIGS. 1A-1B, locations 401(G) and 401(A) have switched from vertical fans to tilting fans.

Figure 5:
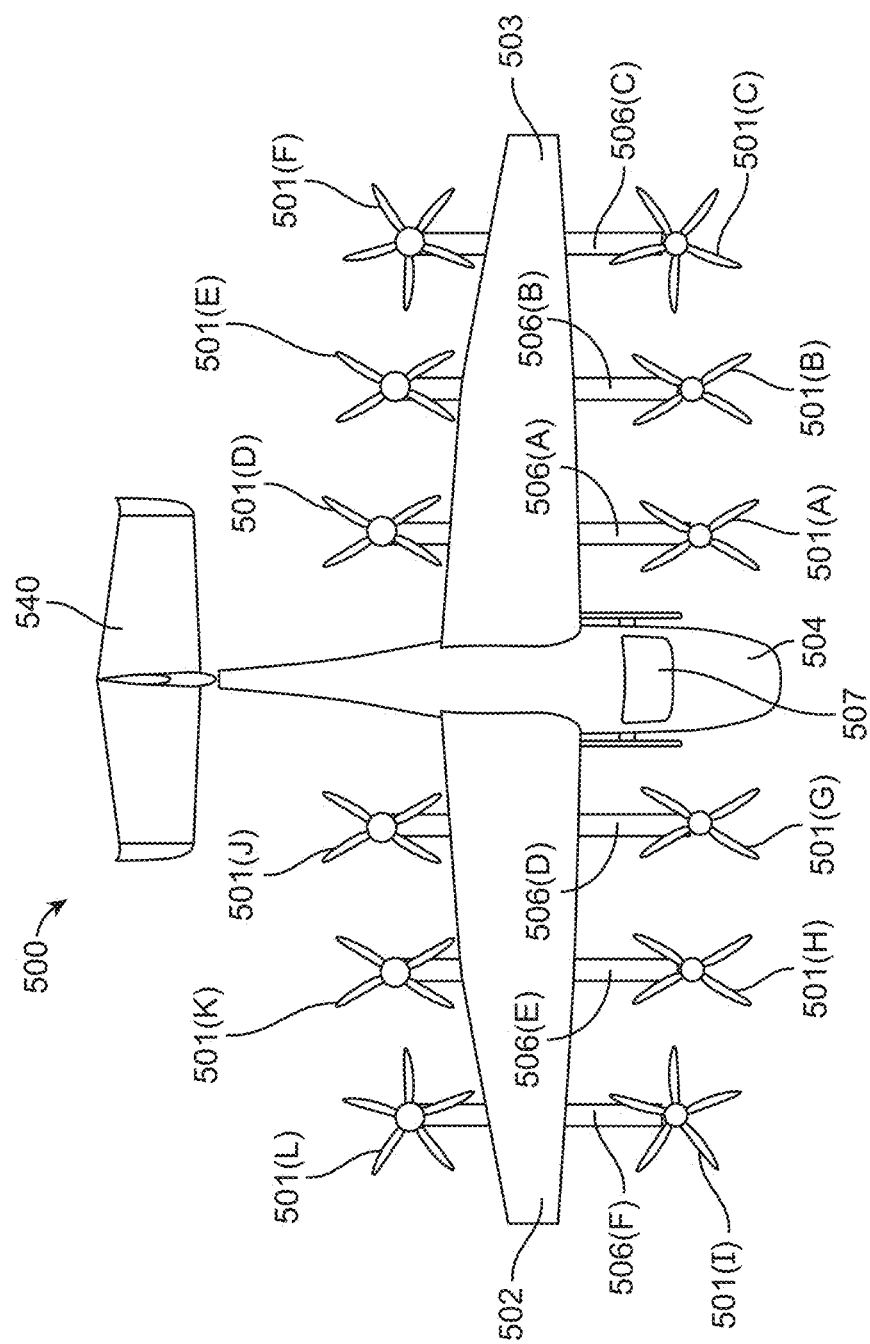
FIG. 5 illustrates an aircraft with a further arrangement of propulsion systems, according to various embodiments.

In FIG. 5 illustrates an aircraft 500 with another arrangement of propulsion systems 501(A)-(L). In this example, the propulsion systems at locations 501(A), 501(B), 501(D), 501(E), 501(G), 501(H), 501(J), and/or 501(K) may be fixed-orientation vertical fans, and the propulsion systems at locations 501(C), 501(F), 501(I), and/or 501(L) may be tilting fans. In other words, the distal ends/corners of each wing have tilting fans, and locations in-between the distal ends have fixed vertical fans. In comparison with FIGS. 1A-1B, locations 501(B) and 501(H) have switched from tilting fans to vertical fans, and locations 501(L) and 501(F) have switched from vertical fans to tilting fans.

Various advantages are provided by each of the arrangements in FIGS. 1A-1B, FIG. 4, and FIG. 5. For example, the arrangement of FIGS. 1A-1B provides the advantage of some amount of matched motors, but may be affected by some amount of drag caused by the fixed vertical fans at locations 401(G) and 401(A). The arrangement of FIG. 4 provides the advantage of each support structure 406(A)-(F) having the same configuration (e.g., one tilting fan and one vertical fan) which may reduce manufacturing costs and complexity by reducing the number of unique support structures and associated parts, but the motors may not be optimally matched and there are additional tilting mechanisms involved. The arrangement of FIG. 5 provides the advantage of a high-degree of control and authority on yaw movement (e.g., movement about the z-axis or spinning movement), lower vibration on the tips of wings (e.g., due to cross-drag), and matched motors, but may be affected by some amount of drag caused by the fixed vertical fans at locations 501(A), 501(B), 501(G), and 501(H).

According to various embodiments, a control system may control flight of an aircraft configured for vertical takeoff and landing.

An aircraft may be in a stationary position on the ground. For example, the aircraft may be parked at a charging station for charging the batteries. Alternatively, the aircraft may be parked at a location awaiting to receive cargo or passengers. A flight control system of the aircraft may receive a flight plan (e.g., from the autopilot, a pilot or a remote controller pilot) to arrive at a predetermined destination. The flight plan may include an instruction to takeoff from the ground. The flight control system may control one or more of the lift fan assemblies to activate. For example, the thrust-producing components of the aircraft may be deactivated or in a standby mode. The flight control system may power up the propulsion systems from an deactivated mode so that they are ready to generate vertical lift.

The control system may operate a first set of one or more propulsion systems coupled to the aircraft. Each of the first set of one or more propulsion systems may have a fixed vertical orientation and at least a first rotor blade, a second rotor blade, a third rotor blade, and a fourth rotor blade. Also, each of the first set of one or more propulsion systems may include a first angle between the first rotor blade and the second rotor blade, a second angle between the second rotor blade and the third rotor blade, a third angle between the third rotor blade and the fourth rotor blade, and a fourth angle between the fourth rotor blade and the first rotor blade. The first angle and the third angle can be acute and equal to one another, while the second angle and the fourth angle can be obtuse and equal to one another.

For example, the flight control system may initiate a takeoff sequence to lift the aircraft off of the ground. The flight control system may operate the first set of one or more propulsion systems to provide vertical thrust so that the aircraft leaves the ground. The flight control system may continue operating the first set of one or more propulsion systems in this manner until a certain time has passed or a certain height is reached (e.g., a safe distance from a landing pad). The control system can continue to operate the first set of one or more propulsion systems during liftoff, hovering, landing, or any other suitable stage of flight to provide vertical thrust.

The control system may at some points control the first set of one or more propulsion systems to stop operating during other stages of flight, such as forward cruising flight when vertical lift may additionally and/or instead be provided by wings of the aircraft. For example, after a certain amount of time has passed and/or altitude gained, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g., a remote-control tower or a remote pilot).

The control system may operate a second set of one or more propulsion systems. Each of the second set of one or more propulsion systems have a fixed horizontal orientation or a tiltable orientation. Each of the second set of one or more propulsion systems may have two or more rotor blades with an angle between each of the blades, where each of the two or more rotor blades are spaced equally such that each angle is equal.

For example, upon receiving the flight instruction to transition to forward flight, the control system may operate a second set of one or more propulsion systems to generate forward thrust for the aircraft. The flight control system can control the forward acceleration in any suitable manner, such as by may gradually increasing the power supplied to the second set of one or more propulsion systems so that the aircraft gradually gains forward velocity.

In some embodiments, the second set of one or more propulsion systems may activate and begin providing forward thrust while the aircraft is still in the process of gaining altitude from the vertical lift fans. As a result, forward travel can overlap with vertical lifting. Additionally, the flight control system can adjust power to the first set of one or more propulsion systems as required to maintain stability and altitude while the second set of one or more propulsion systems causes forward airspeed to increase.

In some embodiments, one or more of the second set of one or more propulsion systems may be operated to tilt between horizontal and vertical orientations. Such tilting propulsion systems may be operated during both one or more steps to provide vertical thrust and one or more steps to provide horizontal thrust.

The control system can continue to operate the second set of one or more propulsion systems during forward cruising flight, forward acceleration, deceleration, or any other suitable stage of flight to provide horizontal thrust. The control system may at some points control the first set of one or more propulsion systems to stop operating during other stages of flight, such as liftoff, hovering, and/or landing. At some points in time, the control system can operate both the first set of one or more propulsion systems and the second set of one or more propulsion systems simultaneously.

Subsequently, the flight control system may deactivate the first set of one or more propulsion systems, or otherwise reduce power provided to the first set of one or more propulsion systems. For example, once the second set of one or more propulsion systems have generated a predetermined velocity so that the wings provide enough lift to maintain altitude, the first set of one or more propulsion systems may no longer be needed for vertical lift. Accordingly, the first set of one or more propulsion systems can be powered down, deactivated, placed in a standby mode, or be operated at a reduced power level during forward flight of the aircraft.

The control system may continue alternating between operating one or more of the first set of one or more propulsion systems and/or the second set of one or more propulsion systems based on flight instructions and flight activities, such as hovering or landing.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front or back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A propulsion system comprising:
   a hub;
   a plurality of rotor blades coupled to the hub, configured to rotate about a vertical axis to generate vertical thrust, wherein a first angle between two adjacent rotor blades of the plurality of rotor blades is an acute angle; and
   a locking mechanism configured to retain the plurality of rotor blades at a predefined rotary position when the propulsion system is deactivated, the predefined rotary position configured so that the first angle faces a direction of forward movement.

2. The propulsion system of claim 1, wherein the propulsion system has a fixed vertical orientation.

3. The propulsion system of claim 1, wherein forward movement is forward flight.

4. The propulsion system of claim 1, wherein the two adjacent rotor blades are a first set of two adjacent rotor blades, wherein a second angle between a second set of two adjacent rotor blades of the plurality of rotor blades is an obtuse angle.

5. The propulsion system of claim 4, wherein the plurality of rotor blades includes:
   a first rotor blade coupled to the hub;
   a second rotor blade coupled to the hub, adjacent to the first rotor blade, and spaced from the first rotor blade by the first angle, wherein the first set of two adjacent rotor blades includes the first rotor blade and the second rotor blade;
   a third rotor blade coupled to the hub, adjacent to the second rotor blade, and spaced from the second rotor blade by the second angle, wherein the second set of two adjacent rotor blades includes the second rotor blade and the third rotor blade; and
   a fourth rotor blade coupled to the hub, adjacent to the third rotor blade, spaced from the third rotor blade by a third angle, and spaced from the first rotor blade by a fourth angle, the third angle is equal to the first angle, and the fourth angle is equal to the second angle.

6. The propulsion system of claim 5, wherein the direction of forward movement is defined as 0 degrees, the first rotor blade has an angular position of 20 degrees or 30 degrees as measured from the direction of forward movement when the plurality of rotor blades are retained at the predefined rotary position, the second rotor blade has an angular position of 150 degrees or 160 degrees as measured from the direction of forward movement when the plurality of rotor blades are retained at the predefined rotary position, the third rotor blade has an angular position of 200 degrees or 210 degrees as measured from the direction of forward movement when the plurality of rotor blades are retained at the predefined rotary position, and the fourth rotor blade has an angular position of 330 degrees or 340 degrees as measured from the direction of forward movement when the plurality of rotor blades are retained at the predefined rotary position.

7. The propulsion system of claim 5, wherein the first angle and the second angle are adjacent and supplementary angles, the second angle and the third angle are adjacent and supplementary angles, the third angle and the fourth angle are adjacent and supplementary angles, the fourth angle and the first angle are adjacent and supplementary angles, the first angle and the third angle are opposite angles, and the second angle and the fourth angle are opposite angles.

8. The propulsion system of claim 4, wherein the first angle is 40 degrees or 60 degrees, and the second angle is 120 degrees or 140 degrees.

9. The propulsion system of claim 4, wherein the first angle is less than 60 degrees, and the second angle is more than 120 degrees.

10. The propulsion system of claim 1, wherein the predefined rotary position is configured so that the first angle is bisected by the direction of forward movement.

11. The propulsion system of claim 1, wherein the direction of forward movement is defined as 0 degrees, and wherein each of the plurality of rotor blades have respective angular positions that are within a first range of 320 degrees and 40 degrees, or within a second range of 220 degrees and 140 degrees when the plurality of rotor blades are retained at the predefined rotary position.

12. The propulsion system of claim 1, wherein each of the plurality of rotor blades have a fixed angular position relative to one another.

13. The propulsion system of claim 1, wherein the locking mechanism is configured to automatically engage when the propulsion system is deactivated.

14. The propulsion system of claim 1, wherein the direction of forward movement is opposite a direction of air resistance.

15. The propulsion system of claim 1, wherein the propulsion system further comprises:
   a rotor comprising the hub and the plurality of rotor blades; and
   an electric motor configured to drive the rotor.

16. A method, comprising:
   controlling, by a control system, a propulsion system to create vertical thrust, wherein the propulsion system includes a plurality of rotor blades configured to rotate about a vertical axis, and a first angle between two adjacent rotor blades of the plurality of rotor blades is an acute angle; and
   deactivating, by the control system, the propulsion system, wherein the plurality of rotor blades are retained at a predefined rotary position by a locking mechanism when the propulsion system is deactivated, and the predefined rotary position is configured so that the first angle faces a direction of forward movement.

17. The method of claim 16, further comprising:
   in response to deactivating the propulsion system, controlling, by the control system, the locking mechanism to retain the plurality of rotor blades at the predefined rotary position.

18. The method of claim 16, wherein the locking mechanism is a passive mechanism that automatically engages in response to deactivating the propulsion system.

19. The method of claim 16, wherein the propulsion system is a first propulsion system, and further comprising:
   receiving, by the control system, a flight instruction to takeoff;
   activating, by the control system, the first propulsion system;
   activating, by the control system, a second propulsion system; and
   controlling, by the control system, the second propulsion system to create a forward thrust, wherein deactivating the first propulsion system is in response to gaining a predetermined amount of forward velocity in the direction of forward movement.

20. The method of claim 19, comprising:
   before deactivating the first propulsion system, controlling, by the control system, the first propulsion system to gradually produce a decreasing amount of vertical thrust in coordination with a gradual gain of forward velocity.

* * * * *